Feb. 26, 1935.  F. O'NEILL  1,992,321
GLASSWARE FORMING MACHINE
Filed June 1, 1928   11 Sheets-Sheet 1
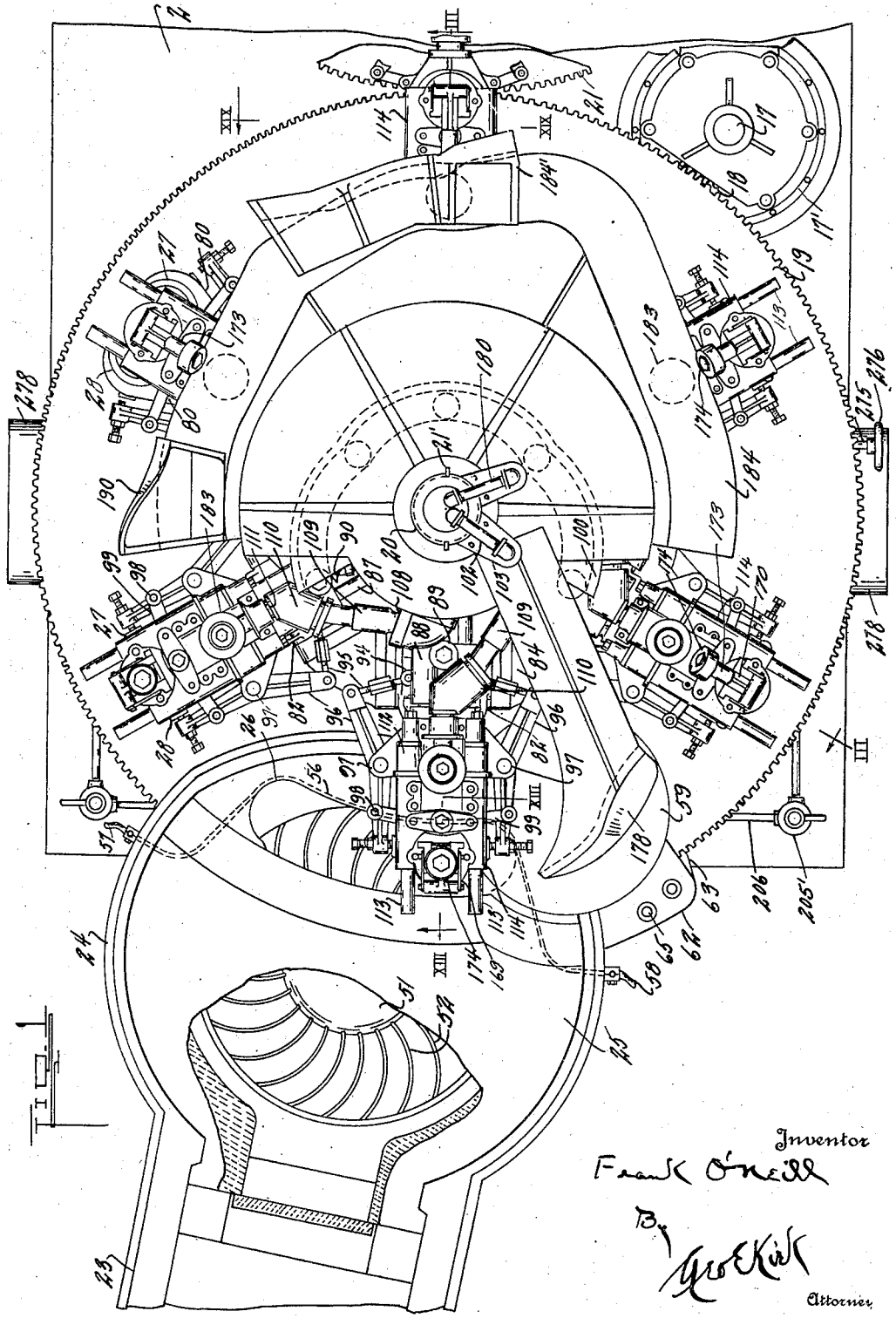
Inventor
Frank O'Neill
By Geo E Kirk
Attorney

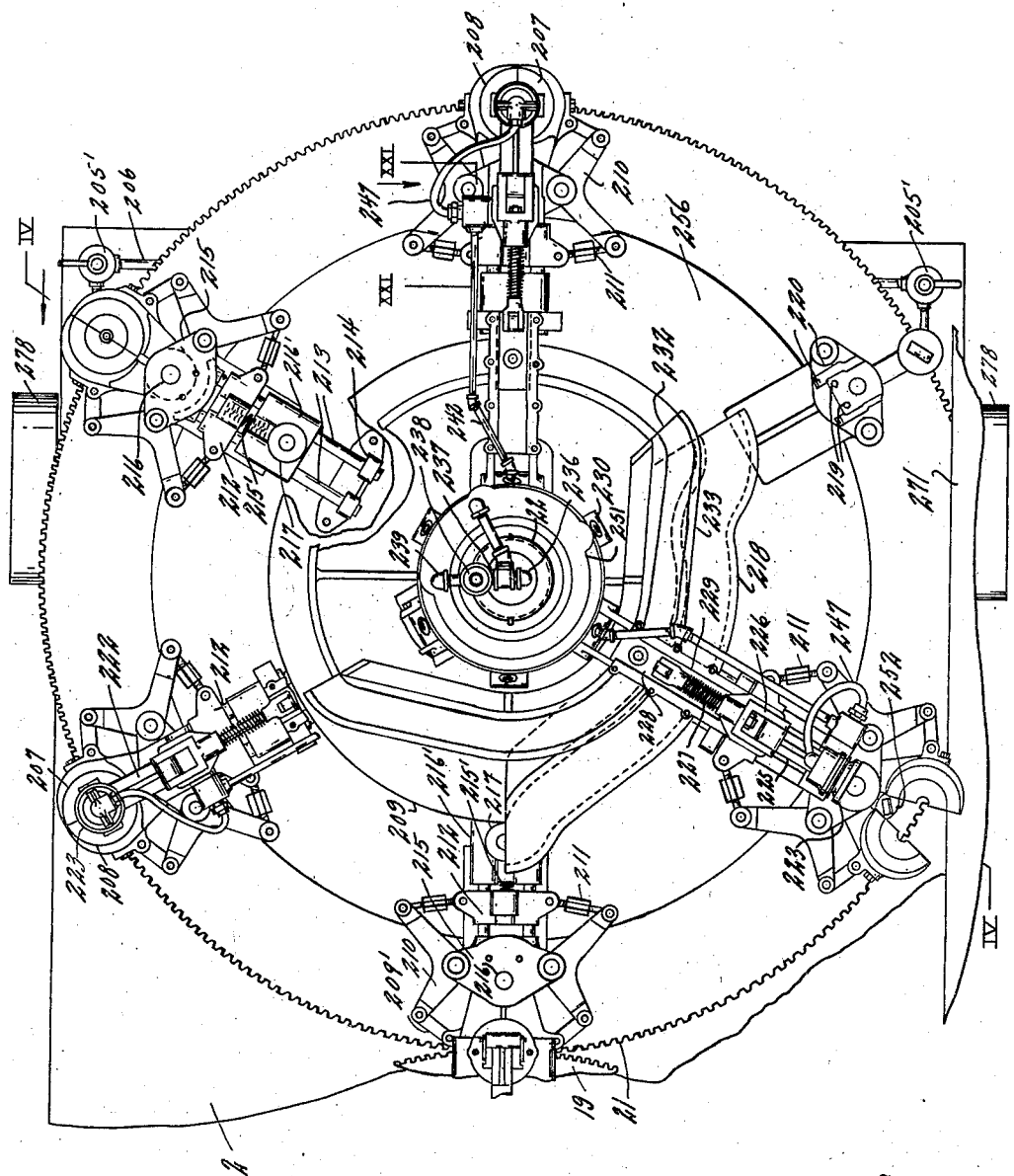

Feb. 26, 1935.  F. O'NEILL  1,992,321
GLASSWARE FORMING MACHINE
Filed June 1, 1928   11 Sheets-Sheet 3
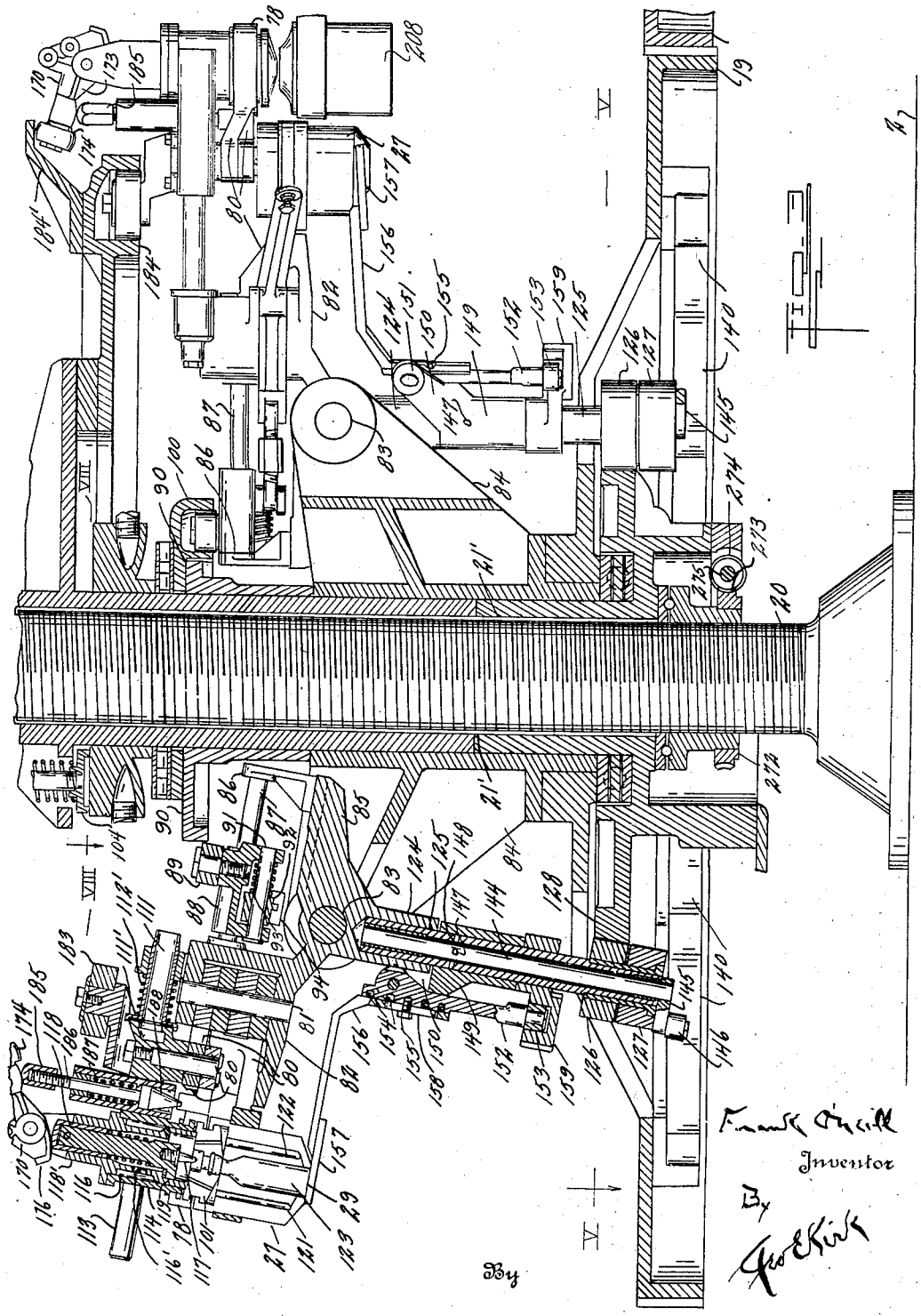

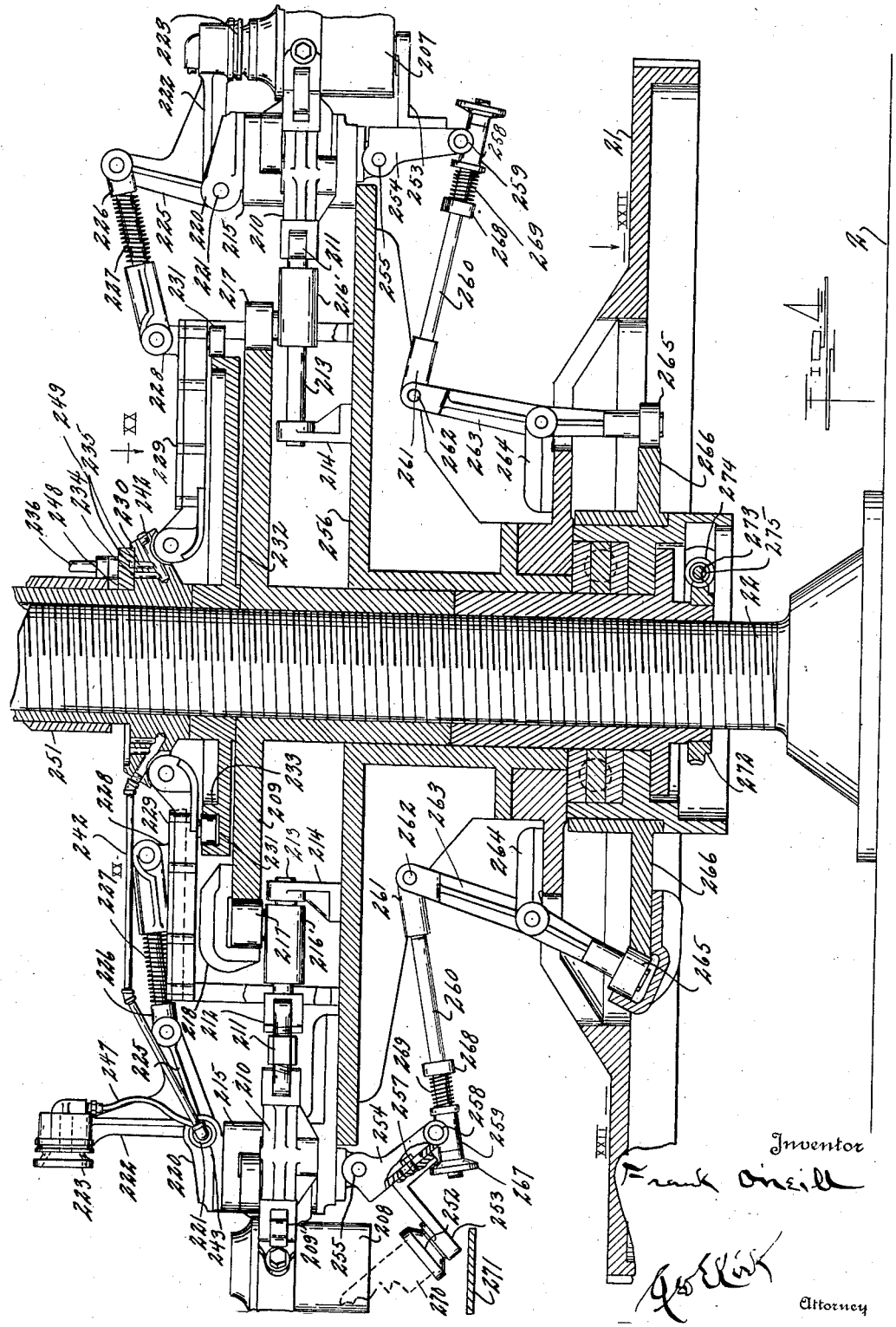

Feb. 26, 1935.　　　　F. O'NEILL　　　　1,992,321
GLASSWARE FORMING MACHINE
Filed June 1, 1928　　　11 Sheets-Sheet 5
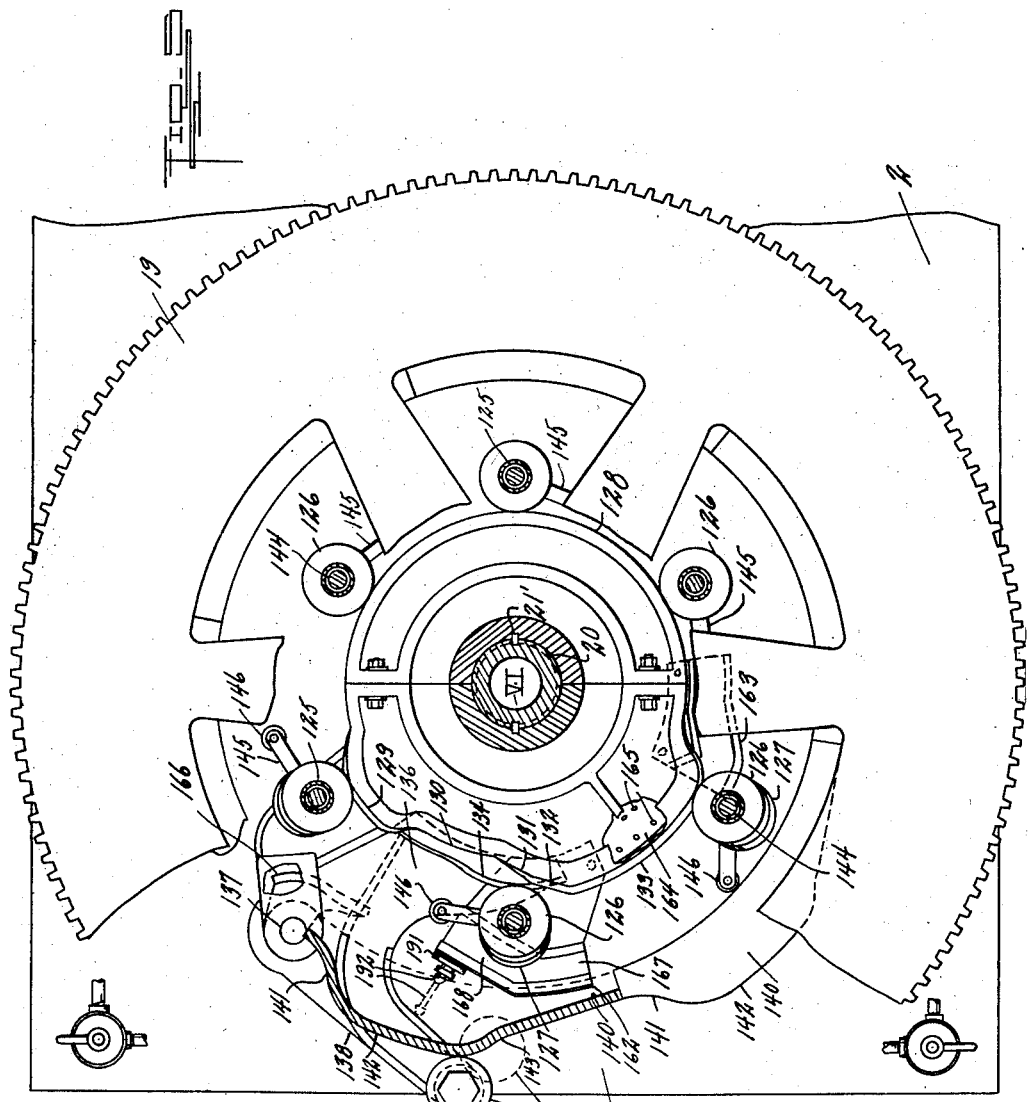
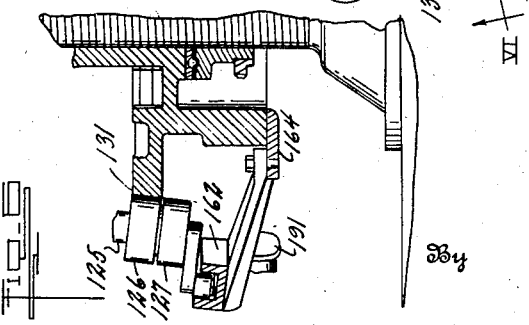

Feb. 26, 1935. F. O'NEILL 1,992,321
GLASSWARE FORMING MACHINE
Filed June 1, 1928 11 Sheets-Sheet 6
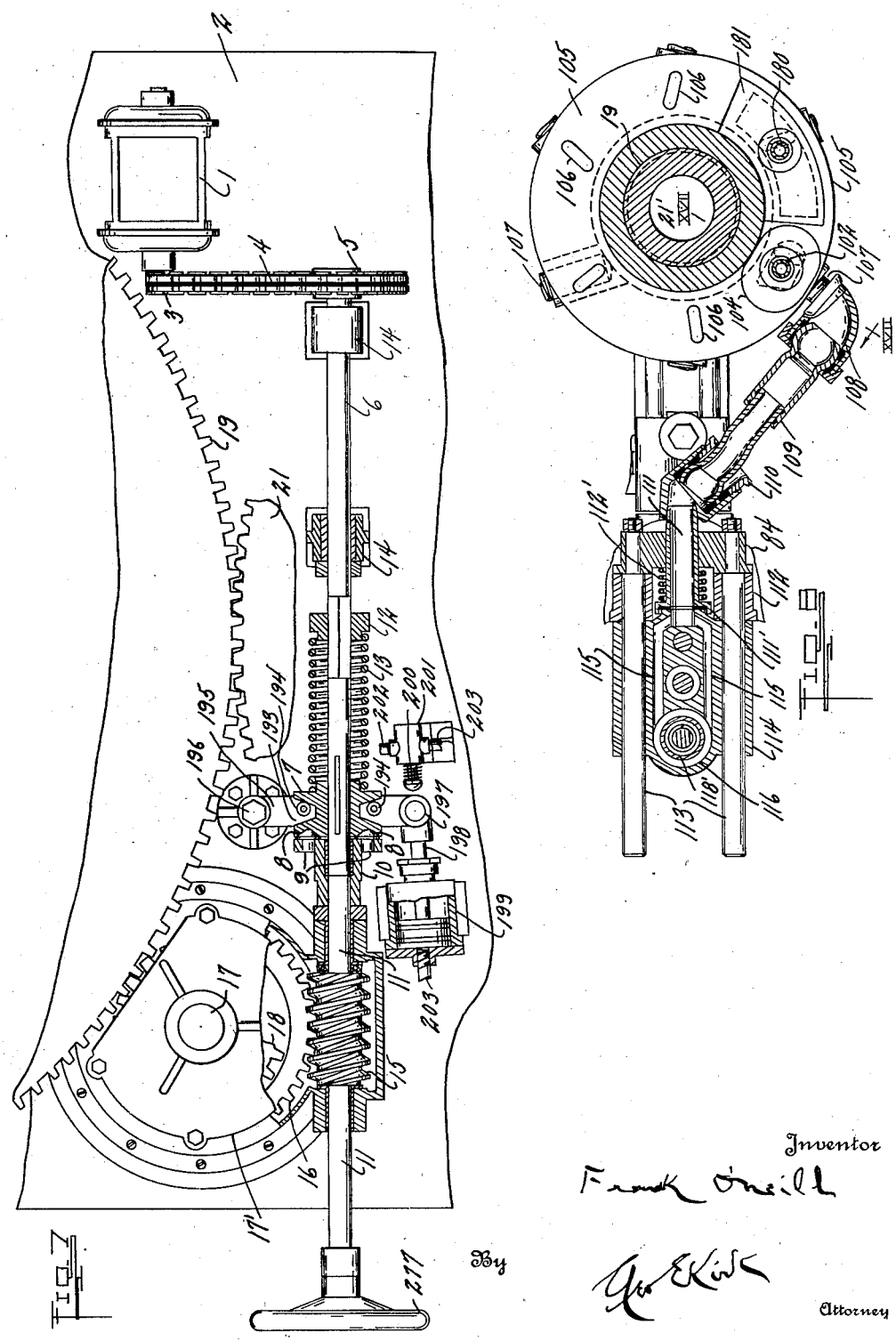

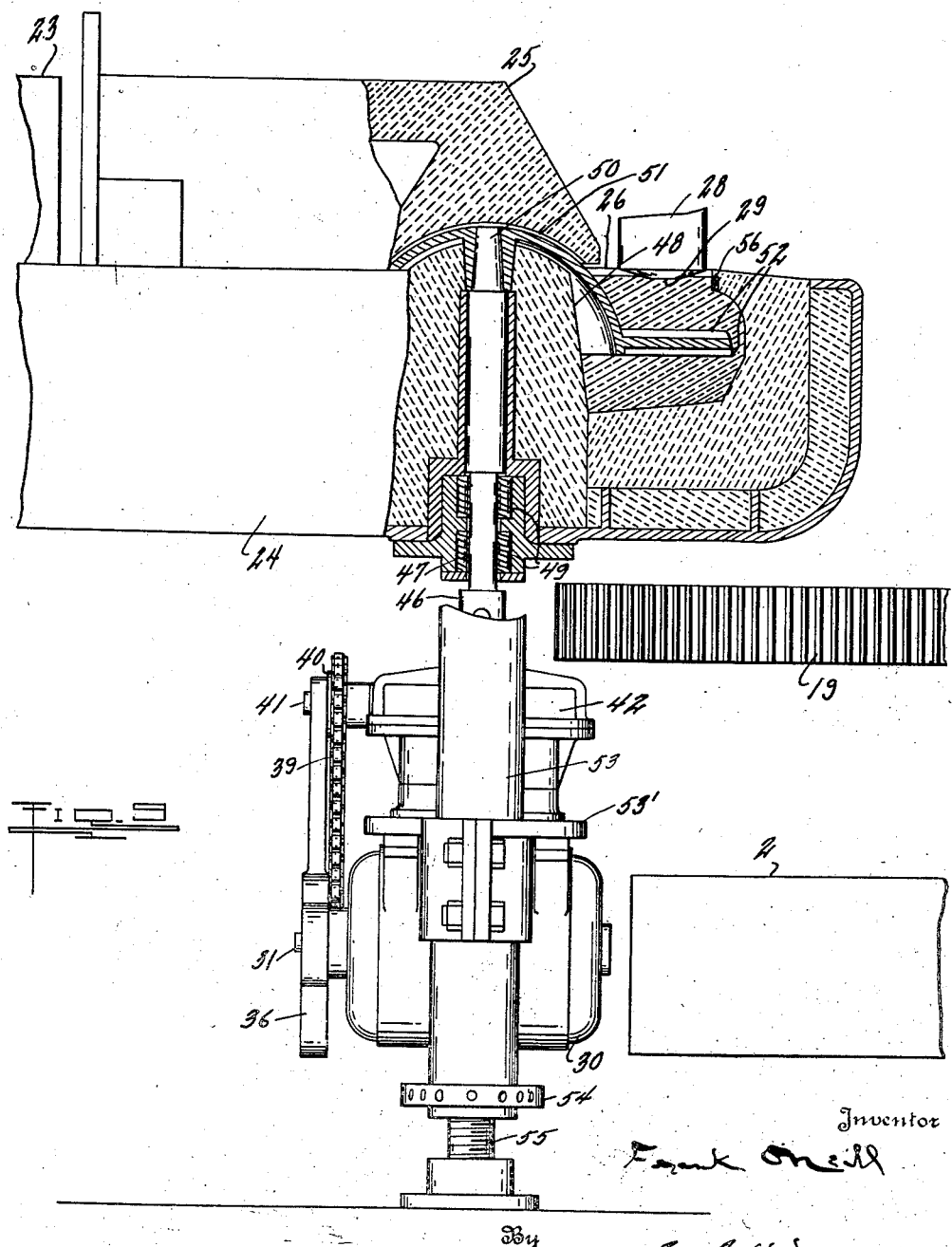

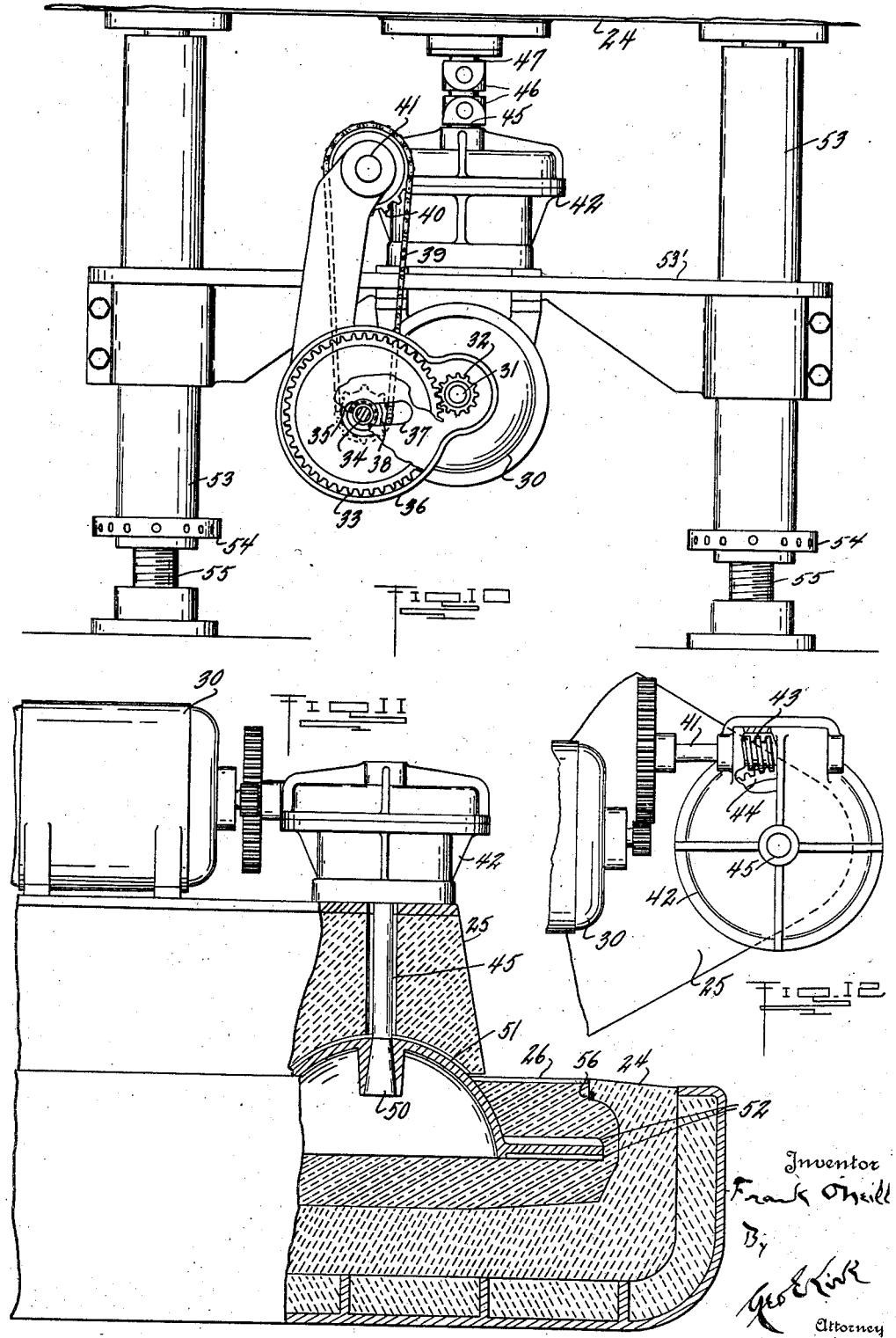

Feb. 26, 1935.   F. O'NEILL   1,992,321
GLASSWARE FORMING MACHINE
Filed June 1, 1928   11 Sheets-Sheet 9
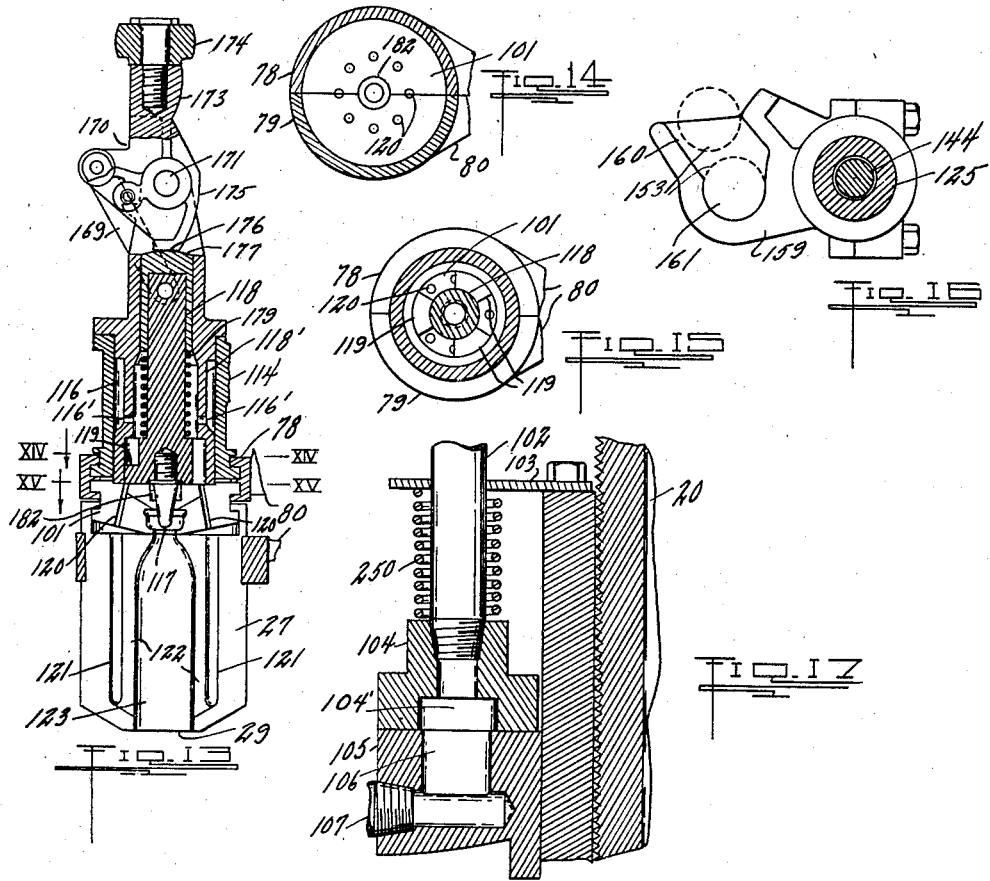
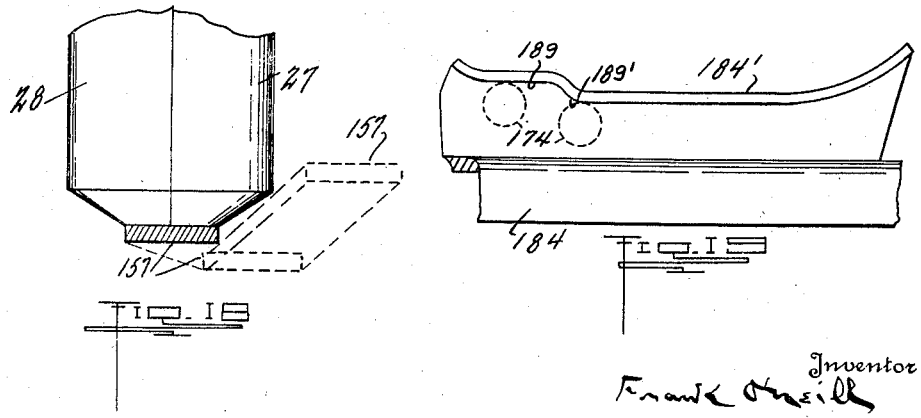
Inventor
Frank O'Neill
By
Geo. E. Kirk
Attorney Feb. 26, 1935.  F. O'NEILL  1,992,321
GLASSWARE FORMING MACHINE
Filed June 1, 1928   11 Sheets-Sheet 10

Frank O'Neill
Inventor

By Geo E Kirk
Attorney

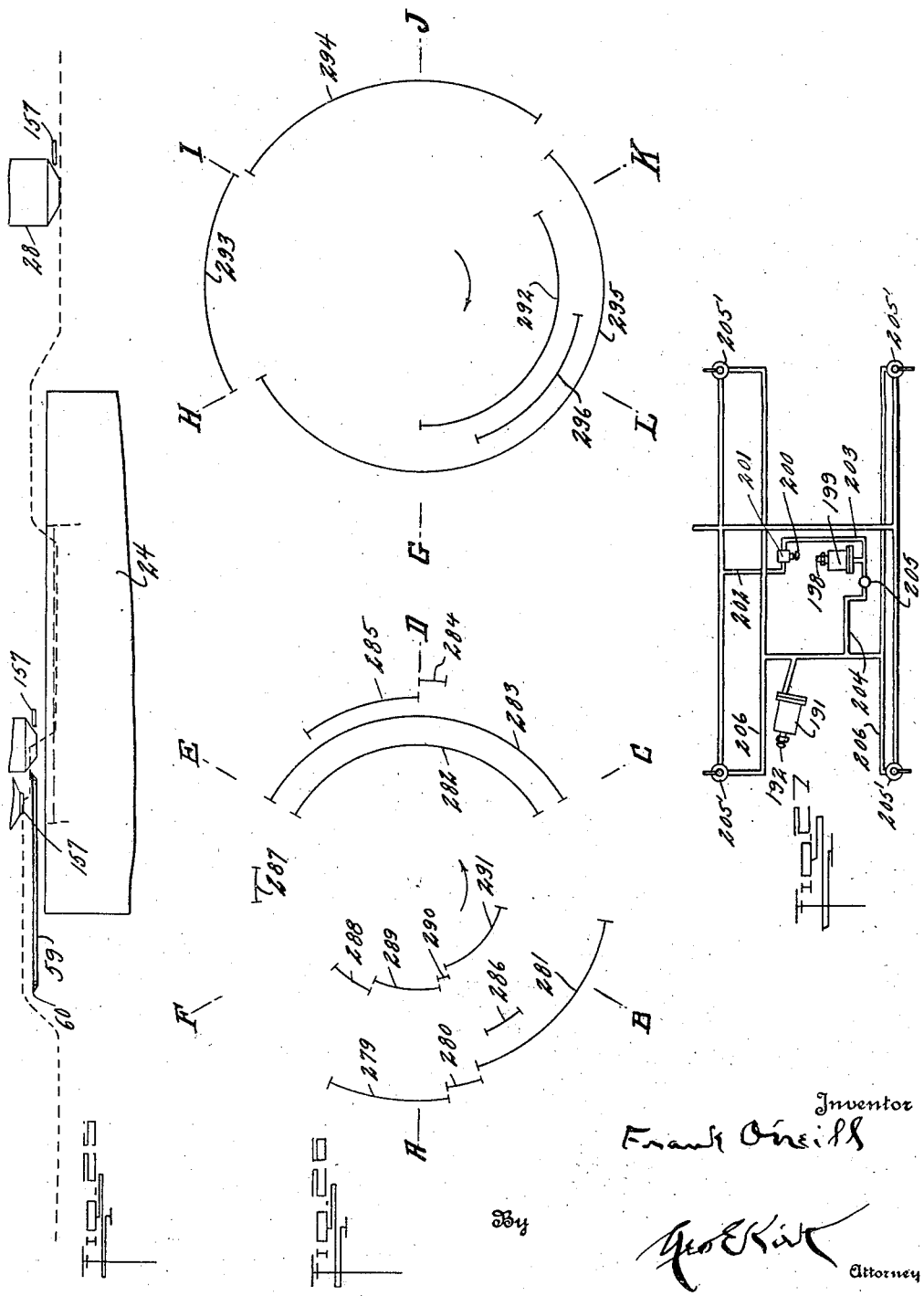

Patented Feb. 26, 1935

1,992,321

UNITED STATES PATENT OFFICE 1,992,321

GLASSWARE FORMING MACHINE

Frank O'Neill, Toledo, Ohio, assignor, by mesne assignments, to Owens-Illinois Glass Company, Toledo, Ohio, a corporation of Ohio Application June 1, 1928, Serial No. 282,088

14 Claims. (Cl. 49—5)

This invention relates to the handling of molten glass, the forming of gathers therefrom, and the working of such gathers into hollow ware.

This invention has utility when incorporated in a combination suction gather and blow apparatus.

In the invention herein there is a stationary tank feeding a pool of molten glass which pool is circulated and has a portion of its surface exposed. The machine proper comprises two continuously rotating members, one of which members rockably mounts the gather or primary forming apparatus and is herein referred to as the blank table while the other rotating member mounts the glassware finishing mechanism and is referred to as the finish or blow table. The second table receives the blank from the first table, completes the blowing operation, and delivers the completed article for annealing.

There is disposed on the blank table an annular series of blank molds herein shown as six in number, each being a complete unit and each comprising a lower or main pair of hinge sections open at the bottom. The blank molds are each carried on a crosshead and besides having travel about a center, have rocking movement to bring the open bottom of the blank mold into proximity with or against the surface of the exposed portion of the pool. These main blank molds have their open bottoms coact with shear means to cut the attenuation therefrom which falls back into the pool after which the mold bottoms are closed. The upper end of the suction gather blank has a plunger withdrawn therefrom after suction gather and the blank packed into the blank mold by pressure flow to complete the blank. The upper portion of the blank is held by an auxiliary or neck finish mold section radially reciprocable on the side toward the blow table, to carry such blank into the region of travel of the finish molds on the blow table, and to deliver such blank into the blow molds for completion into finished ware. The neck finish mold section is then withdrawn to coact with the main blank mold sections to again form a complete blank mold ready for re-charging.

The blank as received by the finish mold is subjected to two blowing operations, a low and a high pressure blow, to complete the article, which is then delivered from the finishing mold by having the finishing molds open and the bottom thereof tilted to allow the article to drop off therefrom onto a conveyor. The device is entirely automatic, self-charging and discharging, and is provided with means for preventing charging when so desired or in case of trouble arising in the mechanism controlling such.

Referring to the drawings:

Fig. 1 is a plan view of the blank forming table;

Fig. 2 is a plan view of the ware finishing table, parts being broken away;

Fig. 3 is a view on the line III—III, Fig. 1, looking in the direction of the arrow;

Fig. 4 is a view on the line IV—IV, Fig. 2, looking in the direction of the arrow;

Fig. 5 is a view on the line V—V, Fig. 3, looking the direction of the arrow;

Fig. 6 is a view on the line VI—VI, Fig. 5, looking in the direction of the arrow;

Fig. 7 is a plan view of the table driving mechanism, parts being broken away;

Fig. 8 is a plan view on the line VIII—VIII, Fig. 3, looking in the direction of the arrow;

Fig. 9 is a side elevation, with parts broken away, of the circulator and drive therefor, for the molten glass in the pool;

Fig. 10 is a view of the circulator drive as from the left of Fig. 9;

Fig. 11 is a side elevation of a modified mechanism for maintaining circulation of glass in the pool;

Fig. 12 is a plan view of the drive of Fig. 11;

Fig. 13 is a view on the line XIII—XIII, Fig. 1, looking in the direction of the arrow, showing the blank mold and the mechanism for coacting therewith, said mechanism being shown as in position during suction or gather;

Fig. 14 is a view on the line XIV—XIV, Fig. 13, looking in the direction of the arrow;

Fig. 15 is a view on the line XV—XV, Fig. 13, looking in the direction of the arrow;

Fig. 16 is a plan view of the adjustable cam for controlling the extent of baffle plate movement for closing the blank mold bottom after charging;

Fig. 17 is a view on the line XVII—XVII, Fig. 8, looking in the direction of the arrow;

Fig. 18 is a diagrammatic showing of the movement of the baffle or blank mold bottom sealing plate as to the blank mold;

Fig. 19 is a view on the line XIX—XIX, Fig. 1, looking in the direction of the arrow;

Fig. 20 is a view on the line XX—XX, Fig. 4, looking in the direction of the arrow;

Fig. 21 is a view on the line XXI—XXI, Fig. 2, looking in the direction of the arrow;

Fig. 22 is a view on the line XXII—XXII, Fig. 4, looking in the direction of the arrow;

Fig. 23 is a plan view of the shear and its drive parts being broken away;

Fig. 24 is a view on the line XXIV—XXIV, Fig. 23, looking in the direction of the arrow;

Fig. 25 is a diagrammatic showing of the blank mold travel as to the pool of glass, shearing mechanism, and bottom sealing baffle;

Fig. 26 is a diagrammatic view of the sequence of operations for the machine as to the two tables; and Fig. 27 is a piping diagram for the safety control features of the machine.

Main drive

Motor 1 (Fig. 7) mounted on base 2 is provided with speed reduction drive herein shown as pinion 3 having chain drive 4 therefrom extending to gear 5 fast on shaft 6. Remote from the gear 5, and splined on the shaft 6, is clutch member 7 provided with depressions 8 with which coact conical studs 9 carried by opposing clutch member 10 fast on shaft 11. Spaced from the clutch member 7 and fast on the shaft 6 is collar 12. Extending between the clutch member 7 and the collar 12 is helical spring 13. Due to this spring acting against the clutch member 7 there is provided a yieldable connection between the members 7, 10. The shaft 6 is mounted in bearings 14 sustained by the base 2.

Fixed on the shaft 11 is worm 15 in mesh with worm gear 16 mounted on vertical shaft 17 in the housing 17'. There is also mounted on this vertical shaft 17 and driven by worm gear 16, pinion 18 in mesh with table gear 19 mounted on column 20 (Figs. 1, 3, 5). The table gear 19 supports the blank forming mechanism and controls the rotation thereof about this column 20 as an axis. The article finishing mechanism is maintained in synchronism with the blank forming mechanism by the table gear 19 in mesh with table gear 21 as mounted upon column 22 as an axis therefor (Figs. 2, 4) which table gear 21 controls the rotation of the finishing mechanism. The various control cams mounted by the columns 20, 22, are held against rotation by keys 21'.

Gather

Tank 23 is provided with overhang boot or forehearth 24 having removable roof 25 providing opening 26 therethrough exposing a portion of the pool surface. The opening 26 is of arcuate form having a radius equal to the radius of the blank mold travel and is disposed in the path of the blank molds. The blank molds comprise main sections 27, 28, having open bottom 29. The travel of the blank mold sections 27, 28, is toward the boot 24 rocking as approaching the boot to clear the overhang and then dipping through the opening 26 to bring the open bottoms 29 against the exposed surface and skimming along such surface for a determined distance and then rising to clear the opposite overhang edge.

Molten glass circulator

The exposed portion of said pool together with the contact of the traveling molds on the molten glass surface has a tendency to create a chill region along the travel line of the mold. To counteract this chilling action there is provided herein a molten glass circulating means which causes the glass in the overhang or boot 24 to flow back under the roof 25 and into a heated region carrying therewith the attenuation from the previous charge. To this end there is provided motor 30 having shaft 31 on which is mounted pinion 32 in mesh with gear 33 mounted on shaft 34. The shaft 34 is mounted in bearing 35 which is carried by frame member 36. The frame member 36 is provided with slot 37 along which slot the bearing 35 is movable toward and from the shaft 31 of the motor. There is thus provided means for substituting smaller or larger gears 33 to vary the speed reduction between the shafts 31, 34. Mounted on the shaft 34 is sprocket gear 38 about which extends chain 39 to sprocket gear 40 mounted on shaft 41. This shaft 41 also serves as a mounting means for its frame 36.

The shaft 41 extends through and is mounted by housing 42 and has mounted thereon and within this housing 42, worm 43 in mesh with worm gear 44 mounted on shaft 45. The shaft 45 has universal joints 46 from which universal joints extends shaft 47 up through refractory member 48 as an island in the glass pool. The boot 24 also mounts bearings 49 for friction reduction on the shaft 47. The shaft 47 terminates in tapered oval end 50 and has mounted thereon stirrer or circulating member 51 which stirrer extends down into the glass pool. This stirrer is provided with fins 52 as glass circulating means and these fins 52 are maintained submerged within the glass.

The boot or overhang 24 may be adjusted as to height by means of supporting columns 53 having nuts 54 (Fig. 10) thereon for rotation up and down on screws 55. Mounted upon the columns 53, bracket 53' serves as a mounting for the stirring mechanism. It will be seen that adjustment of the columns will not only raise and lower the boot but will also raise and lower the stirring mechanism therewith.

In some instances it is desirable to modify this stirrer drive somewhat, so the motor 30 is mounted on the top of the boot roof and its speed reduction gearing 32, 33, directly connected to the shaft 41. Further, the shaft 45 in this latter instance extends downwardly through the roof and terminates in tapered portion 50 for mounting the stirring or circulating member. There is thus maintained a continued circulation of glass from back in the forehearth to the exposed pool portion and back again for re-heating, maintaining a uniform character of molten glass.

It may also be desirable to maintain the exposed portion of the glass pool at a comparatively high temperature, as under some conditions the cooling action may be greater than can be cared for by the circulator. To offset such condition there is provided heating element 56 (Fig. 11) in the forehearth. The heating element 56 extends from one side in the forehearth to the other along the edge of the exposed pool portion maintaining such exposed portion at a comparatively high temperature. Electric current is supplied this element by means of lines 57, 58, (Fig. 1) as extending from an electric source.

The gather shearing mechanism

As a blank mold is charged with molten glass, there is an attenuation extending from such gather to the pool and such is sheared off by means of continuously rotating disk 59 having its edge 60 (Fig. 25) coact with the open bottom 29 of the mold just after the mold is rocked out of contact with the surface of the glass pool. The cutting edge 60 coacting with the bottom 29 forms a shear and immediately after shearing the blank mold is then lifted away from this disk 59.

The blank table 19 is in mesh with gear 61 carried in housing 62 (Figs. 1, 23, 24) supported from the base 2 by means of bracket 63. The gear 61 is in mesh with pinion 64 mounted on shaft 65 also carried by the housing 62. The table gear and the gears 61, 64, form a speed up drive. Mounted on the shaft 65 and rotatable thereby is sprocket 66 having a universal mounting as to the shaft 65 permitting rocking of this gear as to the shaft in any direction.

Extending about and from this sprocket 66 to gear 67 is chain drive 68. The gear 67 is mounted upon shaft 69 (Fig. 24) carried by bearing 70. It is desirable to have the cutting disk at a slight angle as to the mold bottom and also to adjust the disk up and down for coaction with various sizes of molds. The disk angle is also adjustable. On the opposite end of the bearing 70 and splined on the shaft 69 is screw 69' having collar 71 to which the disk 59 is bolted. Coacting with the screw 69' is nut 70' for adjusting the disk up and down as to the bearing 70. The bearing 70 is swingably mounted upon fulcrum 72 carried by bracket 73 which is mounted by pivot pin 73' to bracket 73'' carried from the housing 62. Bolts 74' carried by the bracket 73'' coacts through slot 74'' for locking the bracket 73 as to the bracket 73'' in the desired angular relationship. There is also carried by this bracket 73'' cylinder 74 having rod 76 extending therethrough to the lower end of the bearing 70.

As the mold bottom comes in contact with the disk 59 there is some rocking movement imparted to the disk in order to care for various conditions which may arise and to maintain the disk closely against the mold bottom. As the mold strikes the disk it is desirable that the cutter have some rocking movement. Such rocking is against the resistance of spring 77 about the rod 76 between the end of the cylinder and nuts 76', which spring 77 maintains the disk against the mold bottom. Nut 77' on the rod 76 coacting against the bracket 73'' permits adjustment of the rod as to the cylinder for locating the rocking range of the bearing 70 on its fulcrum 72.

The gear 66 rocks in harmony with the cutting disk and its bearing due to its universal mounting. The speed of the machine gives a quick cutting action insuring a clean cut with the rotating disk continually presenting a slicing action. There is a universal mounting for the disk as well as the gear 66 and the nut 77' permits adjustment of the disk angle even during machine operation.

Diagrammatic explanation

The total number of molds in the machine herein disclosed is twelve: six on the blank table and six on the blow table. In order to present a clear understanding of the operation there is shown in Fig. 26 a diagram in which the molds are in position for just completing a transfer from the blank table to the blow table. The molds at such time are at the points as indicated by the letters "A" to "F" inclusive on the blank table and "G" to "L" on the blow table. The various lines in this diagram present the extent of the different movements of the main control parts of the machine and the extent or region in which such movements occur. For example, a mold at the station "A" would at this point just have received its charge of molten glass. The various steps in the operation of the machine are later and more fully explained.

Blank mold operation

The blank mold as hereinbefore stated comprises a pair of main hinged members 27, 28, and a pair of minor or neck finish mold members 78, 79. The mold members 27, 28, 78, 79, have arms 80 (Fig. 3) extending to hinge pin 81 carried by support 82 which support is rockable upon fulcrum 83 as carried in bracket 84 mounted by the column 20. The support 82 has rearwardly extending arm 85 upon which is mounted bracket 86 mounting slide rods 87. Carried on these slide rods 87 and shiftable therealong is crosshead 88. The crosshead 88 carries roller 89 which coacts with non-rotary cam 90 carried by the column 20. The crosshead 88 carries pin 91 upon which is mounted minor crosshead 92 having spring 93 between this crosshead 92 and the crosshead 88 as a yieldable connection therebetween. Crosshead 92 has ears 94 (Fig. 1) providing swivel mountings for the adjustable length links 95 extending to rocker arms 96 swingable on fulcrums 97 carried by the support 82. The arms 96 have on the opposite side of the fulcrums 97 from the links 95, pivot connections 98 from which extend links 99 to the mold members 27, 28. A sliding movement of the crosshead 88 upon the slide rod 87 will cause, through the connections 95, 96, 97, 98, an opening or closing of these mold sections and the locking thereof in closed position.

The shifting of the crosshead 88 is controlled by the cam 90 and this cam 90 is so constructed as to cause the molds 27, 28 to close at station "E" and to be maintained closed from station "E" through stations "F", "A", "B", and as reaching station "C" to cause said molds to gradually open so that said molds 27, 28 fully open midway between stations "C" and "D". The cam 90 is provided with auxiliary or overhanging cam portion 100 (Figs. 1, 3) for engaging the roller 89 for positive shifting thereof. The mold members 78, 79, carry neck finish mold member 101 (Fig. 13) and the main mold members 27, 28, in closing about this mold member 101 lock the neck finish and the main mold members to form a complete blank mold.

Glass charging

Suction line 102 extends through bracket 103 (Fig. 1) carried by the column 20 to slide valve member 104 (Fig. 3). Mounted about the column 20 and rotatable therewith is valve member 105 (Fig. 8) with which the valve member 104 has sliding coaction. The valve member 105 is provided with a port 106 for each blank mold. The ports 106 extend through the valve member 105 to line 107, thence from the line 107 through flexible joint 108 and coupling 109 to second flexible joint 110 carried by the crosshead 88. Connected with the line 109 through the flexible joint 110 is duct member 111 terminating in seat 111'.

The support 82 provides upstanding bracket 112 (Fig. 1) and mounts slide rods 113 upon which is carried crosshead 114 as a carrier means for the neck finish mechanism and the neck finish mold opening mechanism. Extending through this member or crosshead 114 are ducts 115 (Fig. 8) having connection with the duct 111 maintained sealed during charging by spring 112'. Said ducts 115 extend to cylindrical opening 116 and thence by opening 116' (Figs. 3, 13) into cylinder 118' in said opening. There is mounted in this cylindrical opening 116 the neck forming plunger or nipple 117 carried by member 118 having positioning fins 119 (Figs. 13, 15) as centering means for the member 118 within the cylinder 118' in the opening 116 and yet allow air flow therethrough.

The neck finish mold 101 is provided with ducts 120 between the cylinder 118' and the main blank molds 27, 28. The main blank molds are provided with ways 121 from which there is clearance 122 to the blank form determining region 123. There is thus a suction way from the mold bottom 29 to the suction line 102. The suction action is effected when the valve member 105 is rotating and brings the duct 106 under this valve member 104. The suction interval is regulated by the length of the undercut 104' (Fig. 17) in the member 104 and as the duct 106 passes the valve member 104, the suction is of course shut off.

Mold rocking mechanism

The rocking carrier 82 is provided with downward extension 124 (Fig. 3) mounting tube 125 carrying on the remote end thereof rollers 126, 127. The roller 126 is maintained by gravity of the carrier 82 against cam 128, which cam is carried by the column 20 and is non-rotary. As the carrier is shifted about the column, the cam 128 is so constructed as to give a rocking movement to the support 82 in the cycle of travel. The mold members 27, 28, have a normal travel height extending from between stations "B" and "C" around to station "F". Upon passing station "F" the mold members approach the boot 24. Upon approaching the boot 24 the cam 128 is provided with offset region 129 (Fig. 5) causing the mold to rock up over the edge of the boot. Cam region 130 allows the mold to drop, bringing the mold bottom to the surface of the pool for charging, which is approximately the normal travel level of the blank molds. Upon charging, the cam 124 has portion 131 causing the mold to again lift from the pool to clear the opposite edge of the boot and also to bring the mold to shearing position.

The cam 128 has portion 132 extending to portion 133. As the roll 126 is traveling along this cam and the mold having been charged, such roll contacts the portion 131 for lifting the mold from the glass pool. At this point there is brought into action a second cam 134 coacting with roll 127 causing a more abrupt lifting of the blank mold and permitting a horizontal travel for cutting. The cam 134 is mounted on arm 136 having fulcrum 137 on which fulcrum the arm is swingable. The arm 136 has extension 138 carrying roll 139. Mounted on the underside of the table gear 9 are cams 140, one of these cams for each mold. The cam 140 has portion 141 extending to portion 142, which portion 142 extends to portion 143. As the table 9 rotates, the cam portion 142 comes in contact with the roll 139 to throw such roll outward thereby causing the cam 134 to be swung into the region of travel of the roll 127. The cam 140 is so disposed that its portion 141 strikes the roll 139 just as the blank mold is having its charging completed. As the roll 139 rides upon the cam portion 142, the cam 134 has been thrown outward and has shifted the roll 127 outward from the column center for this abrupt mold lifting and the roll 127 then rides along portion 135 of the cam 134 imparting to the blank mold a short horizontal traveling distance during which time the cutting or shearing takes place. The roll 126 then reaches the portion 132 of the cam 128, which causes the mold to lift away from the shearing disk.

Bottom sealing

Immediately after shearing, the bottom of the blank mold is sealed.

The downwardly extending tube 125 (Fig. 3) has extending centrally therethrough rod 144 having at its lower end arm 145 carrying roller 146. The rod 144 remote from the arm 145 has pin 147 therethrough, which pin extends through slot 148 in the tube 125 and is connected to member 149 shiftable about the tube 125. The member 149 carries bracket 150 providing fulcrum 151 for rockably mounting arm 152 having mounted thereon at its downward end roller 153. The arm 152 has threaded openings 154 therein with one of which openings, bolt 155 may coact to mount angle member 156 carrying baffle plate 157. The angle member 156 may be adjusted as to the arm 152 by having the bolt 155 coact with a different opening 154. As a further adjustment, the angle member 156 is provided with slot 158 through which the bolt 155 extends. The arm 145 has oscillation imparted thereto for swinging the baffle 157. Mounted on the tube 125 is cam 159 with which the roller 153 coacts. This cam 159 is angularly adjusted as to the tube 125 to vary action between the cam 159 and the roller 153. As the roller 153 is swung into the cam coacting position, it rides into region 160 (Fig. 16) and thence to region 161. Passing through region 160 it causes the arm to be swung toward the tube 125 thereby giving a lifting to the baffle and as it rides into the region 161 there is a locking action. At this point the baffle is in mold bottom sealing position, held there due to the locking action between the roll 153 and the cam portion 161.

The oscillation is obtained by means of cams 162 and cams 163 (Figs. 5, 6). These cams 162, 163, are bolted on plate 164 having openings 165 therein permitting shifting of the cams along this plate to vary the time interval of mold sealing. As the arms 145 travel about the column 20 as carried by the tubes 125, the rollers 146, if in an abnormal position, strike fixed cam 166 throwing such into line for action imparted thereto by the cam 162. The cam 162 is provided with outward extending portion 167, causing this roller 146 to be thrown outward from the column 20 thereby swinging the baffle plate into its mold sealing position.

As the roller 146 is traveling along cam portion 168, the roller 153 has been brought to cam portion 160 and further travel along this portion 168 has caused the roll 153 to reach cam portion 161 as a lock position for the baffle 157 as to the molds 27, 28, just as the roll 146 leaves this portion 167. The mold is thus maintained sealed as this roller 146 travels between the cams 162 and 163. As the roller 146 then comes in contact with the cam 163, such arm is thrown inward toward the column by the action of the cam 163 and the baffle plate thrown out of mold sealing position in which position such travels around the machine before again receiving cam action from the cam 162.

Mold packing and preliminary forming

As the suction is completed, the plunger 118 (Fig. 13) carrying the nipple 117 is lifted. This lifting action is caused by a pulling upward of the plunger 118 by links 169 connected to rocker 170 having fulcrum mounting 171 carried by the cylindrical member 118' disposed in the opening 116. This rocker member 170 has upwardly extending arm 173 carrying roller 174. The rocker member 170 is also provided with cam region 175 extending to cam region 176. In the suction position of the plunger 118, the cam portion 176 contacts member 177 slidably mounted on the plunger 118. Immediately after the suction is completed the roller 174 strikes cam 178 (Fig. 1) causing the arm 173 to be rocked inwardly bringing the cam portion 175 in contact with the member 177 and lifting the plunger 118 by means of the arms 169.

There is between the plunger 118 and the member 177 yieldable means or helical spring 179. As this plunger 118 has lifted, pressure air flows by line 180 through slide valve member 181 (Fig. 8) and thence through duct 106 and the suction line becomes a pressure line allowing air flow to the neck finish member 101 to flow through central opening 182 (Figs. 13, 14) thereof to distend the blank and to pack such in the mold for completion thereof. During the blowing, the baffle 157 is in mold sealing position. As this packing blow is completed, the baffle is swung out; the mold has reached station "C", the main mold members 27, 28, open; and the crosshead 114 is caused to slide outwardly on the slide rods 113. This movement is obtained by having the roller 183 (Figs. 1, 3), which is carried by the crosshead 114, contact cam 184. The cam 184 is so shaped as to cause the blank to be brought to position for being received by the blow molds on the blow table at station "D". A portion of cam 184 imparts to the neck finish mold a short travel distance on the blow mold travel line extending from a short distance before station "D" to just therebeyond. This facilitates the transfer permitting the blow mold to fully close about the blank as loosely held by the neck finish before the neck finish is fully opened to complete blank transfer.

Transfer

As approaching station "D" cam 184' (Figs. 1, 3, 19) mounted on the cam 184 coacts with roller 174 causing the arm to be swung downward to strike nut 185 carried by plunger 186 causing such plunger to be thrown against the resistance of spring 187. Mounted on this plunger 186 is conical member 188 disposed between the arms 80 of the neck finish mold. As this cone member 188 is forced for a slight downward movement due to cam 184', the neck finish is slightly loosened so that the blank is loosely carried until such blank reaches station "D" at which point the roller 174 is further thrown downward causing the plunger to be forced still farther down between the arms 80 of the neck finish mold when such blank is dropped into the blow mold. The loosening of the neck finish and also the extent of neck finish mold opening may be adjusted by adjustment of the nut 185 as to the plunger 186. This is a feature permitting varying the opening of the neck finish for accommodating various sizes of ware, and as controlled by cam regions 189 causing the loosening and cam region 189' causing the neck finish mold opening. As the blank mold leaves station "D" on the transfer point, the spring 187 lifts the plunger wedge 188. The neck finish mold is caused to recede back to the region of the main blank mold and the main blank molds are then caused to close about the neck finish mold, closing such mold for recharging and as the mold has reached station "E" the closing has been completed.

Disposed between station "E" and "F" is cam 190 (Figs. 1, 13) with which the roller 174 coacts for throwing the arm 173 up into vertical position to cause the plunger 118 to be depressed to bring the nipple 117 into the neck finish. As the mold 27, 28, reaches station "F" it is again ready for charging.

Safety features

The cam 134 (Fig. 5) may be held in its thrown out position so that as the roll 126 approaches the cam portion 130 such cannot reach such portion due to the cam 134 coacting with the roll 127 and forming a bridge between the cam portions 129 and 132. To this end cylinder 191 is mounted by the plate 164 (Figs. 6, 27) and has plunger 192 (Fig. 5) contact the arm 138 holding such arm outward so that such arm receives no action from the cam 140.

The clutch member 7 is provided with groove 193 (Fig. 7) in which ride rollers 194 carried by arm 195 having fulcrum 196. Remote from the fulcrum 196 the arm 195 has rocking connection 197 with plunger 198 extending into cylinder 199. In the event of sticking of the machine the clutch member 7 is thrown away from the clutch member 8 due to the action of studs 9 swinging the arm 195 so that the connection 197 strikes plunger 200 opening valve 201 allowing air to flow from line 202 (Figs. 7, 27) to line 203 into cylinder 199 holding the plunger 198 outward so that there is no knocking rotation between the clutch members. The machine is thereby stopped and air flows from the line 203 by branch 204 past one-way valve 205 to the cylinder 191 causing the plunger 192 to be thrown outward against the arm 138 which in turn throws the cam 134 lifting the mold from the glass so that in any event the machine is stopped due to internal difficulties the mold is lifted from the glass pool so there will be no injury to the mold due to its being stopped in the molten glass.

It may be desirous to run the machine without having feed thereto and to this end manual valves 205' (Fig. 27) are disposed at various points around the machine so that an operator by opening any one of these valves 205' may allow air to flow by line 206 to the cylinder 191 and such air may not pass the one-way valve 205 so that the driving mechanism is not cut out although the cam 134 is thrown out prohibiting dipping of the mold 27, 28, into the pool for feeding notwithstanding the machine tables may still be rotating.

Blow table

On the blow table blow molds are mounted comprising hinge sections 207, 208 (Fig. 2). These blow molds close about the blank at station "G" of the transfer and at this station "G" have just completed their closing to receive this blank and as closed carry the blank to station "H" for a low pressure blow which extends from station "H" to "I" where the blank then receives a high pressure blow extending beyond station "J" and after such high pressure blow is completed the blow molds are opened and the finished ware delivered from the blank table between stations "K" and "L".

The opening and closing of the blow molds is obtained through action of cam 209 (Figs. 2, 4). The hinge sections 207, 208, have links 209' extend therefrom to rocker arms 210 from which rocker arms extend adjustable links 211 to crosshead 212 mounted on slide rods 213 mounted by brackets 214, 215. The bracket 215 further provides hinge pin 216 as the fulcrum upon which the blow molds swing. The crosshead 212 has yieldable connection 215' with crosshead 216' upon which crosshead 216' is mounted roller 217 coacting with the cam 209. Just before the blow molds have reached the transfer station the roller 217, such roller 217 has been forced outward by the cam 209 thereby closing the mold. The molds are held closed until the roll comes in contact with overhang cam portion 218 which cam portion 218 causes the blow molds to start to open at station "K" and bring such to fully open position between stations "K" and "L" and hold such open until just before reaching the transfer station when such molds are closed about a new blank as received from the blank table.

Mounted upon the bracket 215 by means of bolts 219 is bearing providing member 220 for pin 221 (Figs. 4, 21) as a fulcrum for rocker arm 222, provided at one end thereof with blow head 223. This blow head 223 is rocked to center such on the blow mold at station "H" and to maintain such until both the low and high pressure blowing has been completed when such arm is rocked to lift the blow head from the mold permitting ware discharge and blank receiving.

The blow head 223 (Figs. 2, 4) is loosely mounted on the arm 222 permitting centering on the mold. The arm 222 has angular extension 225 connected to yoke 226 having yieldable connection 227 to crosshead 228 mounted in slide 229 rising from table 256 which slide 229 extends radially from the column 22 where it is connected to member 230 thereby causing the member 230 to rotate with the table 256. The crosshead 228 is given a sliding movement in and out radially from the column 22 by means of roller 231 carried by said slide coacting with non-rotary cam 232. Between station "H" and just before reaching station "K" the slide is maintained outward from the column thereby holding the blow head on the mold. However, as the roller 231 approaches station "K" it contacts cam 233 causing the slide to be pulled toward the column thereby lifting the blow head.

Blow air supplies

The member 230 (Figs. 2, 4) is mounted about the column 22 and is provided therein with a series of ports 234 and a series of ports 235. Extending upwardly through the hollow column 22 is air line 236 having branch 237 extending through reducing valve 238 to line 239 extending to slide valve member 240 (Fig. 20) having groove 241 therein and connecting it to the air line 239. This valve member 240 is stationary and the rotation of the member 230 brings the series of ports 234 to coact with this groove 241 thereby permitting air flow through the ports 234 to lines 242 extending to collars 243 (Figs. 4, 21) about the pins 221. These pins 221 are provided with grooves 244 having ports 245 extending therefrom to the center of such pins which have ducts 246 centrally thereof to which are connected lines 247 extending to the blow heads 224. As a blow head 224 is rocked as to this pin 221, there is still maintained a direct line from the duct 234 to the blow head. The length of low pressure blow may be varied by the length of the groove 241 in the valve member 240 which valve member is retained from rotation by its connection with the air line. As the low pressure blow is completed high pressure blow follows. This is accomplished by having line 236 extend to slide valve plate 248 (Fig. 20) having groove 249 therein which groove coacting with an opening 235 allows high pressure air to flow therethrough to the line 242. During this high pressure blow the valve plate 248 further acts in sealing the connected opening of duct 234 prohibiting back flow therethrough. The valve plates 104, 240, 248, are maintained against the slide member 230 by means of springs 250 (Fig. 17) between these valve members and collars 105, 251 about the columns 20, 22.

Ware discharge

The blow mold sections 207, 208, close about bottom portion 252 (Fig. 4) supported by arm 253 which arm is adjustably mounted upon swinging arm 254 mounted by fulcrum 255 carried by the under side of the bracket 215, which bracket and blow mold opening mechanism is carried upon table 256 mounted by the column 22 and rotatable with gear 21 about the column as an axis. The arm 253 is adjustably mounted as to the arm 254 by nut 257 for permitting adjustment of the bottom section 252 for various sizes of molds. The arm 254 has pivotal connection 258 to collar 259 mounted on link rod 260 extending to yoke 261 having mounting 262 with rocker arm 263 mounted by bracket 264 carried by the table gear 21. The depending end of the arm 263 is provided with roller 265 coacting with cam 266.

The throw radius of the bottom 252 may be adjusted by hand wheel 267 as threaded upon the rod 260. The rod 260 is further provided with collar 268 fast therewith and having helical spring means 269 between the collar 268 and the collar 259 as a yieldable take up connection between the bottom 252 and the cam 266. The cam 266 is non-rotary and is so shaped as to cause a swinging outward of the roller 265 between stations "K" and "G", and a swinging in of this arm just before reaching station "G" to have the mold bottom 252 within the blow mold when closing at the transfer. As the mold leaves station "K" in its travel toward the transfer, the cam 266 (Fig. 22) throws the roll 265 outward thereby causing the mold bottom 252 to drop and to reach its maximum downward drop between the stations "K" and "L" for depositing ware 270 on conveyor 271 (Fig. 4).

Table adjustments

The columns 20, 22, (Figs. 3, 4) are threaded and provided with nuts 272 thereabout having worm gears 273 mounted therewith in mesh with worms 274 on shafts 275 provided with hand wheels 276 (Fig. 1) so that the entire mechanism on each table may be raised and lowered as desired. Hand wheel 277 (Fig. 7) is provided on the shaft 11 for permitting hand rotation of the table to any desired point. The base 2 may be mounted on rollers 278 (Figs. 1, 2), for facilitating movement of the machine from place to place in and out of the furnace.

Operation

Referring to Fig. 26 and as hereinbefore stated, the stations are lettered "A" to "L" consecutively. The suction takes place within the region as indicated by line 279; the shearing immediately following in the region 280 and which in turn is immediately followed by the packing blow extending through region 281. The blank mold opening and closing takes place within region 282 and the neck finish mold movement for transfer is within the region 283. The loosening of the neck finish is accomplished in the region 284 and the cracking or opening of this neck finish takes place at the transfer and said neck finish is held open through region 285. The throw of the roll 174 for raising the nipple 117 is accomplished within the region 286 and its resetting for suction is within the region 287. The mold in following its normal travel height reaches region 288 where it is rocked up to clear the boot edge; is dropped and so travels through region 289 for suction gather; has a first lifting within the region 290 for cutting and baffle sealing and travels through region 291 during the blow back operation and then returns to its normal travel height to extend around through the various stations until it again approaches the boot.

On the blow table the blow molds are opened for discharge and closed within the region 292. This region ends at the transfer where such molds are fully closed and remain such through the lower pressure blow region 293 and the high pressure blow region 294. The blow head is lifted shortly after the high pressure blow and is maintained lifted throughout the region 295 until such region approaches station "H" where at such station it again has been brought to contact the blow mold. The bottom dropping and lifting is accomplished within the region 296 the actual discharge being near the beginning of such region.

There is herein disclosed a continuously driven glassware forming mechanism involving not only features for rapid production but for safety to the mechanism as well. The mold rocking cam and the auxiliary lifting cam comprise a control in sequence and permit full operations herein during the rapid movements of the machine. There is maintained, due to the circulating means, a continuous supply of uniform molten glass, such supply being maintained even during machine adjustments or machine shut down for minor repairs. The machine is susceptible to a wide range of ware sizes and has easily completed adjustments for handling various sizes. The adjustable height boot and table lend a nicety for operation of the machine in charging adjustment to various ware sizes and discharging.

What is claimed and it is desired to secure by United States Letters Patent is:

1. A traveling carrier, an open bottom blank mold, a support mounting the mold for shifting relatively to the carrier, a tank providing a pool of molten glass against the surface of which pool said mold may be brought by the carrier travel, a first directing guide for determining positioning of the support, a second directing guide movable during carrier travel relatively to the carrier and tank for additionally positioning the support, said guides together determining a cycle of travel for the mold with the carrier travel for effecting dipping of the mold into the pool and removal of the mold therefrom, and a guide control operable to preclude mold dipping even during carrier travel.

2. A traveling carrier, an open bottom blank mold, a support mounting the mold for shifting relatively to the carrier, a tank providing a pool of molten glass against the surface of which pool said mold may be brought by the carrier travel, a first directing guide for determining positioning of the support, a second directing guide adjustable during carrier travel relatively to the carrier and tank for varying the dip of the mold at the pool, said guides together determining a cycle of travel for the mold, and means for operating the second guide to preclude mold dipping even during carrier travel.

3. A traveling carrier, an open bottom blank mold mounted thereby, a tank providing a pool of molten glass against the surface of which pool said mold may be brought by the carrier travel, actuating and control connections for the mold and carrier for effecting relative dipping of the mold at the region of the surface of the pool, and a stop for the carrier cutting out mold dipping positioning regardless of the proximity of the mold to the region of the surface of the pool.

4. A traveling carrier, an open bottom blank mold mounted thereby, a tank providing a pool of molten glass against the surface of which pool said mold may be brought by the carrier travel, power actuating and control connections for effecting in automatic sequence relative dipping of the mold at the region of the surface of the pool, and a cut-out rendering the dip inoperative even with the carrier continuing its travel.

5. Glass handling mechanism comprising a sectional mold, forming means including a neck finish plunger for molten glass as delivered into the mold, an actuator for determining a plurality of positions of the means, a closure for the upper end of the mold, and a plunger for opening a section of the mold, said last mentioned plunger being operable by said actuator at a position away from the forming operation position.

6. A traveling carrier, an open bottom blank mold, a support pivotally mounting the mold for rocking relatively to the carrier, a tank providing a pool of molten glass against the surface of which pool said mold may be brought by the carrier travel, a first directing guide for positioning the support during carrier travel in one range and a second directing guide movable relatively to the carrier and tank for additionally positioning the support in a different range, said mold in shifting from one range to another having its axis tilted to a position out of perpendicular to the plane of the pool, one of said ranges being at the pool and there tilting the axis of the mold from non-perpendicular to a position perpendicular to the pool.

7. A rotary carrier, an open bottom blank mold, a rockable support mounting the mold for shifting relatively to the carrier, a tank providing a pool of molten glass against the surface of which pool said mold may be brought by the carrier travel, a first directing guide coacting to rock the support relatively to the carrier for a path in the range of travel of the carrier, and compensating means within the length of said path to vary the dip of the mold as to the surface of the pool into a different range of travel embodying laterally along said first guide a second relatively radially adjustable directing guide.

8. Glass handling mechanism effective for taking a charge of molten glass to a mold comprising first and second mold pairs for giving form to a glass charge, control means for opening the second pair to leave the first pair engaging the suspended form of glass, a receiving sectional mold, a first carrier for the first and second mold pairs, a second relatively eccentric carrier for the receiving sectional mold, driving means causing continuous travel of said carriers, actuating means for closing the sectional mold around the suspended form of glass, and a control for loosening the engagement of the first mold pair as said form is centered into the closing receiving sectional mold, there being actuating means thereafter further opening the first mold pair for complete release of the form of glass to be thereafter sustained by the receiving mold, said control means, actuating means and control having means acted upon by the mechanism during said travel and effective on the mold pairs and sectional mold.

9. Glass handling mechanism effective for taking a charge of molten glass to a mold comprising a first mold pair, cooperating means rendering said pair effective for engaging a suspended form of glass, a receiving sectional mold, a first carrier for the first and second mold pairs, a second relatively eccentric carrier for the receiving sectional mold, driving means causing continuous travel of said carriers, actuating means for closing the sectional mold around the suspended form of glass, and a control for loosening the engagement of the first mold pair as said form is centered into the closing sectional mold, there being actuating means thereafter further opening the first mold pair for complete release of the form of glass to be thereafter sustained by the receiving mold, and adjustable means in said control for varying the extent of the first mold pair opening, said cooperating means, actuating means, and control having means acted upon by the mechanism during said travel and effective on the mold pairs and sectional mold.

10. Glass handling mechanism having an open bottom mold, a carrier therefor, a closure for the mold bottom normally laterally of and above the mold bottom, means for gathering a charge of molten glass into the mold, a cut-off for the gathered charge, a control shifting the closure into mold bottom closing position, and a horizontal axis rockable mounting for the mold and closure.

11. Glass handling mechanism having an open bottom mold, a carrier therefor, a closure for the mold bottom normally laterally of the mold bottom, means for gathering a charge of molten glass into the mold, a control shifting the closure into mold bottom closing position, means for varying the extent of closure shifting, and a horizontal axis rockable mounting for the mold and closure.

12. Glass handling mechanism having an open bottom mold, a carrier therefor, a closure for the mold bottom, said closure having a first position normally laterally of the mold bottom, means for gathering a charge of molten glass into the mold, a control shifting the closure into mold bottom closing second position, additional means in sequence with the control for shifting the closure into the first position, said latter means being adjustable whereby the time extent of mold closing may be varied, and a horizontal axis rockable mounting for the mold and closure.

13. Glass handling mechanism having an open bottom mold, a rockable support for the mold, a carrier for the support, a pool of glass against the surface of which said mold contacts for gathering a charge of molten glass, shear means for cutting the gather from said pool, and a closure for the mold bottom mounted by said support and swingable therewith and relatively thereto into mold closing position after shearing.

14. In a glass forming machine, a rigid supporting member pivotally supported at one end to swing angularly about a horizontal axis, an open bottomed suction gathering receptacle carried by said rigid supporting member in a position located beyond the free end of the latter, means for moving said rigid supporting member horizontally along a path having a portion adjacent to a glass gathering pool, cam means comprising a generally circular cam having spaced portions, for swinging said rigid supporting member angularly about said horizontal axis to lift the lower end of said receptacle across each of spaced walls for said pool during the travel of said supporting member along part of said path and for maintaining the pivoted supporting member at a substantially constant level during the remainder of its travel along said path, said level and the position of said receptacle on said supporting member being predetermined to maintain the axis of the receptacle vertical during the travel of the supporting member at such level and to permit the lower end of the receptacle to contact with the glass of the pool during part of such travel.

FRANK O'NEILL.